Sept. 16, 1969  N. N. STEPHANOFF  3,467,317
FLUID ENERGY GRINDING METHOD AND MEANS
Filed Sept. 26, 1966  3 Sheets-Sheet 1

INVENTOR
Nicholas N. Stephanoff
BY Arthur A. Jacobs
ATTORNEY

Sept. 16, 1969  N. N. STEPHANOFF  3,467,317
FLUID ENERGY GRINDING METHOD AND MEANS
Filed Sept. 26, 1966  3 Sheets-Sheet 2
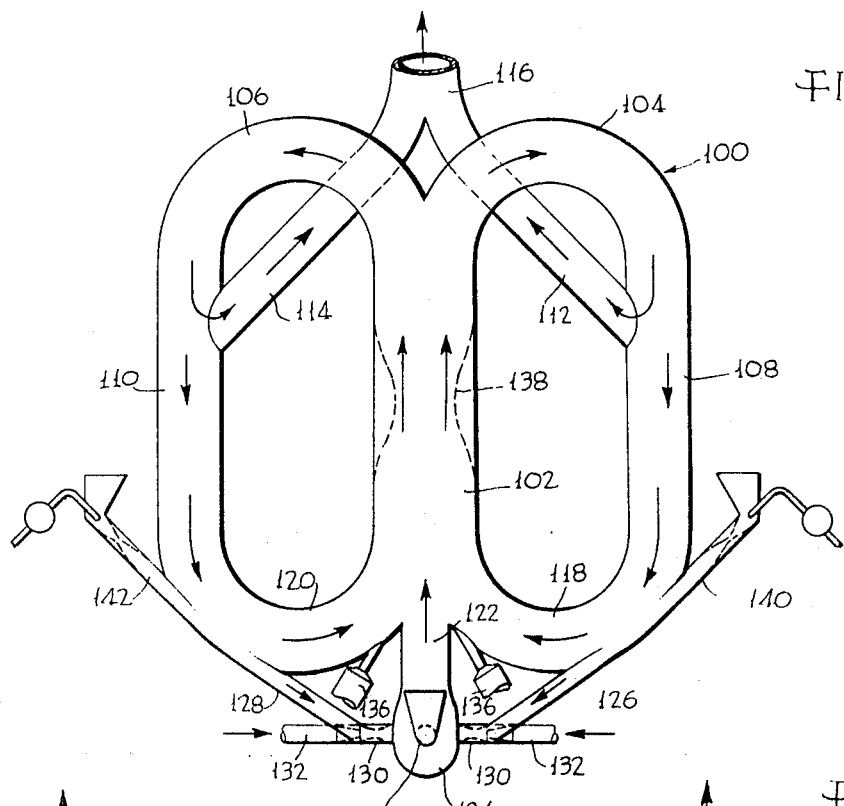
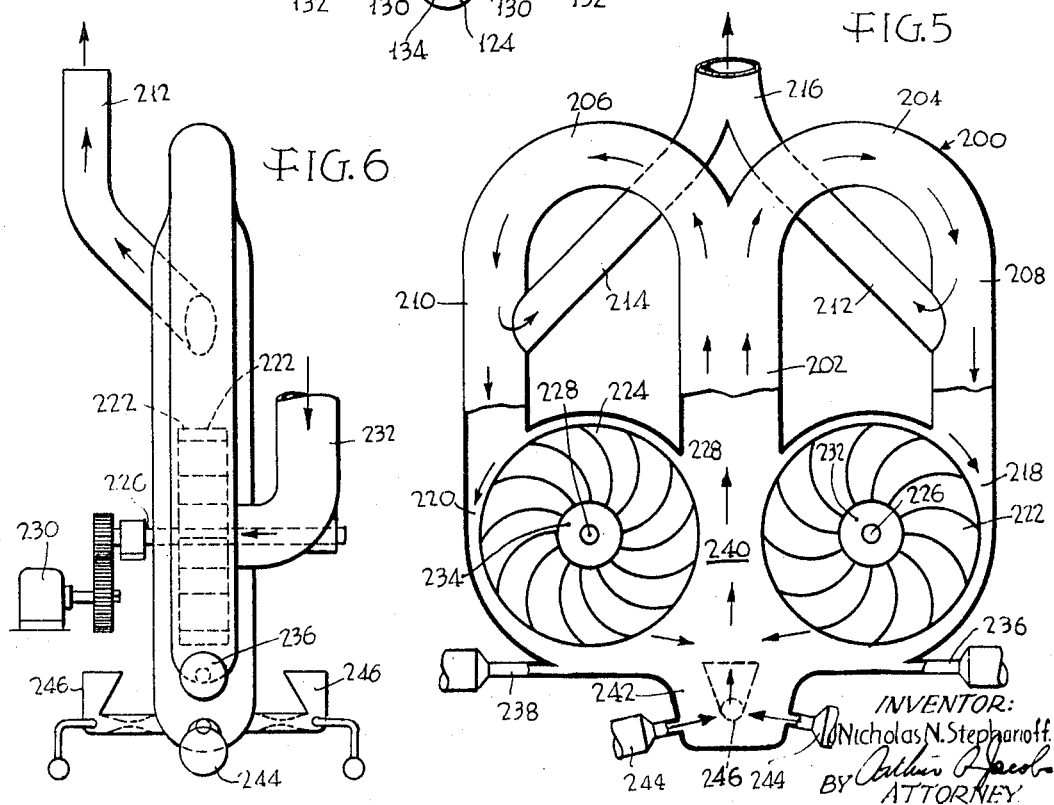
INVENTOR:
Nicholas N. Stephanoff.
By Arthur Jacobs
ATTORNEY

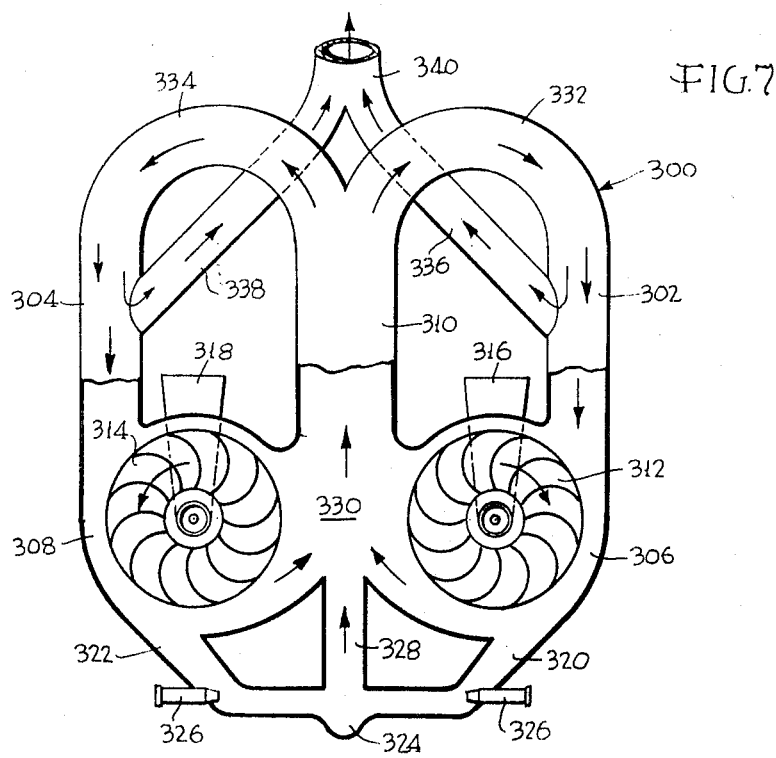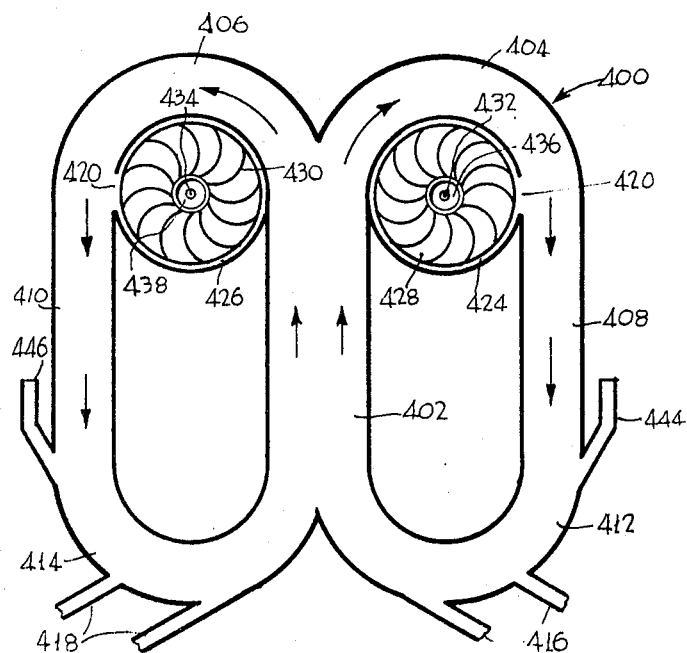

United States Patent Office 3,467,317
Patented Sept. 16, 1969

3,467,317
FLUID ENERGY GRINDING METHOD
AND MEANS
Nicholas N. Stephanoff, Haverford, Pa., assignor to Fluid
Energy Processing & Equipment Company, Lansdale,
Pa., a corporation of Pennsylvania
Filed Sept. 26, 1966, Ser. No. 582,110
Int. Cl. B02c 19/06, 11/08; B02b 5/02
U.S. Cl. 241—5                              11 Claims

ABSTRACT OF THE DISCLOSURE

A fluid energy grinding mill comprising an impact chamber having gaseous fluid propelling nozzles directed generally toward each other from opposite directions so that the gaseous fluid streams inpinge against each other, and feed means for feeding solid particles into the impact chamber where they are impacted against each other by the oppositely directed fluid streams. Annular stacks are provided through which the particles and gaseous fluid from the impact chamber are centrifugally whirled and where the lighter particles are centrifugally separated from the heavier particles. Accelerating means are also provided to accelerate at least a portion of the heavier particles and entertaining gaseous fluid for a further pass through the annular stacks but without passing through the impact chamber.

---

This invention relates to fluid energy grinding or pulverizing mills, and it particularly relates to mills of this type which utilize a circulatory flow to convey the pulverized particles through a classification and separation area.

Circulatory fluid energy grinding mills of this general type have heretofore utilized high-velocity streams of gaseous fluids as the grinding or pulverizing force, whereby they created a high-energy vortex in which the particles impacted each other, and then used the same high pressure fluids as a conveying means to carry the pulverized particles through the classification and separation zone. Since much energy is lost by the fluids in the pulverization vortex, it was necessary to supply sufficient fluids under sufficiently high velocity to both effectively pulverize and effectively circulate the products of pulverization. Since high energy, high velocity fluids are relatively expensieve, and since a large part of the work performed by such fluids consisted of a conveying function which, in itself, does not require the use of such high energy fluids, the process was inherently wasteful. Furthermore, since the greater the kinetic energy of the fluids, the greater the degree of pulverization effected and the finer the particle size of the pulverized products, and since it was always necessary to use excess fluid energy to perform the double function, it was extremely difficult to adequately control the particle size of the product. In other words, if a relatively coarse particle size was desired, it could not readily be produced without adversely affecting the efficient operation of the mill. In addition, the circulating high pressure fluids, upon leaving the classification zone would carry back into the impact zone not only relatively large, unpulverized particles which required further pulverization, but some smaller and lighter particles which would not require much more pulverization but which did tend to clog both the high-pressure nozzles and the impact area itself, thereby not only interferring with the high-pressure fluid flow but also somewhat cushioning the effective impacts of the unpulverized particles.

It is one object of the present invention to overcome the aforesaid difficulties by providing a method and apparatus wherein the high pressure or high energy fluid streams are used primarily for pulverization while an effective circulation of the pulverized products through the classification and separating zone is maintained.

Another object of the present invention is to provide a method and apparatus of the aforesaid type wherein the pulverization zone will be substantially free of relatively fine particles.

Another object of the present invention is to provide a method and apparatus of the aforesaid type wherein the degree of pulverization can be effectively regulated.

Other objects and many of the attendant advantages of this invention will be readily appreciated as the same becomes better understood by reference to the following description when read in conjunction with the accompanying drawings wherein:

FIG. 4 is a view similar to FIG. 1, of a second embodiment of the invention.

FIG. 5 is a view, similar to FIG. 1, of a third embodiment of the invention.

FIG. 6 is an end view of the mill of FIG. 5.

FIG. 7 is a view, similar to FIG. 1, of a fourth embodiment of the present invention.

FIG. 8 is a view, similar to FIG. 1, of a fifth embodiment of the present invention.

Figure 1:
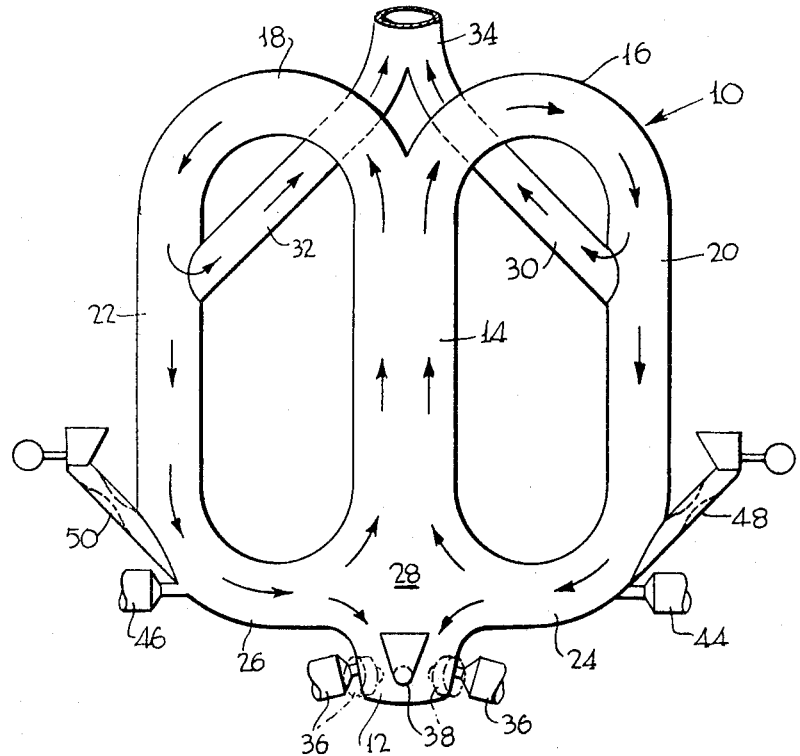
FIG. 1 is a somewhat diagrammatic, side elevational view of a mill embodying the present invention.
Figure 2:
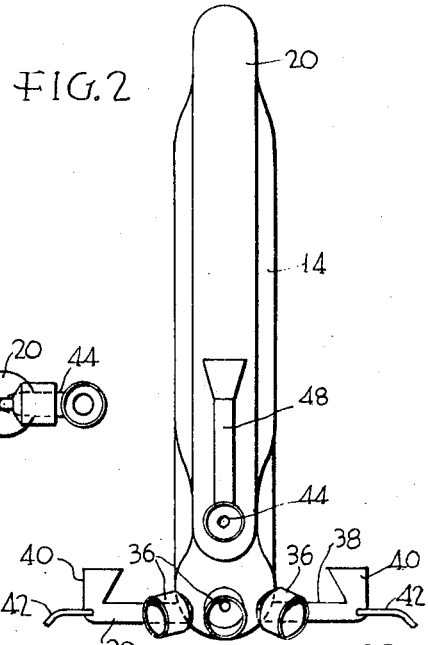
FIG. 2 is an end view of the mill of FIG. 1.

Referring in greater detail to the various figures of the drawings wherein similar reference characters refer to similar parts, there is shown in FIG. 1 a grinding mill, generally designated 10, comprising an impact or grinding chamber 12, from the upper portion of which extends an upstack 14. At its upper end, the upstack 14 divides into two opposite arcuate elbow portions 16 and 18, the elbow portion 16 being integral with a downstack 20 and the elbow portion 18 being integral with a downstack portion 22. The downstack portions 20 and 22 are respectively integral with lateral return ducts 24 and 26 which lead toward each other into a recycle area or chamber 28 between the grinding chamber 12 and the upstack 14. Outlet ducts 30 and 32 respectively lead from the radially inner walls of the downstacks 20 and 22 to a common outlet 34.

Figure 3:
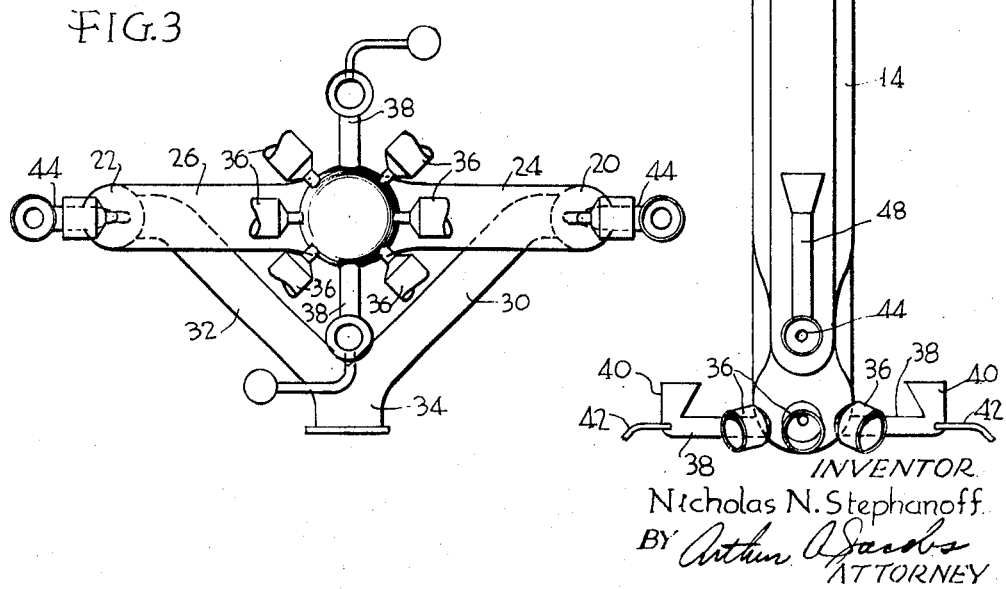
FIG. 3 is a bottom view of the mill of FIG. 1.

Connected to the grinding chamber 12 are a plurality of high-pressure gaseous fluid nozzles 36. There are six such high-pressure nozzles 36 illustrated, three from each of two opposite directions. This is the preferred arrangement, although the number and positions thereof may vary. These nozzles 36 are connected to a source (not shown) of a high-pressure elastic (gaseous) fluid such as air, steam or the like, and are so arranged that all six nozzles are angled toward a common point (as best seen in FIG. 3). Furthermore, each of the nozzles is angled upwardly (as best seen in FIG. 1). Positioned to inject granular solids into the area of the common point of impact of fluid streams from the nozzles 36 are a pair of oppositely-disposed feed inlets 38. The feed inlets 38 preferably have a Venturi internal configuration and are provided with hoppers 40 for insertion of the raw solids. High-pressure fluids are injected through nozzles 42 to entrain the solids from the hoppers 40 and propel them through the feed inlets 38 into the grinding chamber. Although fluid jet type feeds are illustrated, it is possible to use any other type of feed such as screw conveyors, gravity feeds, etc. At the junction of each down stack 20 and 22 and its respective return duct 24 and 26 is provided at least one nozzle, as at 44 and 46 respectively, which is connected to a source of low pressure elastic fluid (not shown). These nozzles 44 and 46 provide a fluid flow which circulates from the respective downstacks 20 and 22, through the area 28 above the grinding chamber 12 and through the upstack 14.

In the mill illustrated in FIG. 1, each downstack 20 and 22 is provided with an auxiliary feed inlet, as at 48 and 50 respectively. These inlets also are provided with hoppers and fluid propellant nozzles similar to the inlets 38 although here, too, other hoppers of feed means may be substituted. Solid particles fed through the inlets 48 and 50 would be entrained in the circulating gaseous fluid and, if sufficiently large and heavy, would drop down into the grinding chamber 12 and be subjected to the pulverization action of the fluid streams from the nozzles 36. However, these auxiliary inlets 48 and 50 are not necessary to the action of the mill and are only optionally provided.

In the operation of the mill 10, the solid particles injected into the grinding chamber 12 through the inlets 38 (and, optionally, also through the auxiliary inlets 48 and 50) are impacted against each other in a vortex caused by the fluid jet streams issuing from the nozzles 36. Because of the upwardly inclined arrangement of the nozzles 36, there is a resultant component of flow in the upward direction into the area 28 from where they can move into the upstack 14. This upward component of flow need only be sufficient to carry the pulverized particles into the area 28 because, in that area, they are entrained by the gaseous fluids from the nozzles 44 and 46 and transported by these fluids into the upstack 14 and then through the opposed downstacks 20 and 22. As a result, most of the energy of the high-pressure fluids from the nozzles 36 is utilized only for grinding. Because of this, less of such high-pressure fluid need be used than would otherwise be the case.

The generated centrifugal force, as the pulverized particles pass upwardly through the upstack 14 and then downwardly through the opposed downstacks 20 and 22, causes the finer, lighter particles, which centrifugally travel along the inner portion of the mill, to pass out through the outlet ducts 30 and 32, while the heavier, coarser particles, which centrifugally travel along the outer portion of the mill, pass through the return ducts 24 and 26 into the area 28. If the particles so returned are still relatively coarse and heavy, they will pass, by centrifugal force, into the grinding chamber 12 and be resubjected to the impact forces generated by the high-pressure streams from the nozzles 36. If the particles are almost finished, that is, relatively fine and light, they will be passed through the area 28, back into the upstack 14 and then into the outlet ducts 30 and 32, by the viscous drag of the fluid which overcomes the centrifugal force. During this re-cycling movement, these particles may have some further impacts with each other causing further pulverization, but such pulverization is only of a light type which does not require the large impact forces generated in the grinding chamber 12.

The apparatus has been described as being utilizable with high-pressure fluid streams from nozzles 36 and low pressure streams from nozzles 44 and 46. However, if desired, high-pressure fluids can also be injected through the nozzles 44 and 46, whereby in addition to a conveying function, the streams can also impact each other in the area 28 creating a sort of secondary or auxiliary grinding chamber to further pulverize the particles passing up from the grinding chamber 12.

The high and/or low pressure fluids may be either cool, such as air at atmospheric temperature, or hot, such as steam, hot air, or products of combustion. If cool, the mill functions only as a pulverizing apparatus. If hot, it serves the double function of pulverizing and drying. In this respect, it may sometimes be desirable to use relatively cool fluids in the chamber 12 for pulverizing and relatively hot fluids may be injected through the nozzles 44 and 46 for the purpose of drying the pulverized particles as they are cycled through the mill. In this manner, the drying cycle would not interfere with the grinding action and the products of pulverization, which might be relatively heavy when wet, could be recycled until sufficiently dry and light to pass through the outlet ducts 30 and 32.

On the other hand, hot gases usually have greater kinetic energy than cool gases, and it may be preferable to use such hot fluids for pulverization. In such case, such hot gases may be injected through the nozzles 36 for grinding, while cooler fluids may be injected through the nozzles 44 and 46 to act not only as a recycling means but also as a cooling means. Of course, both the high-pressure and the low pressure fluids may have the same temperature conditions, that is, either both hot or both cool.

FIG. 4 illustrates a modification of the mill of FIG. 1, wherein the mill, generally designated 100, comprises an upstack 102 dividing into oppositely extending arcuate elbow portions 104 and 106, each of which leads into a downstack, as at 108 and 110. Each downstack has an outlet duct, as at 112 and 114, that lead into a common outlet 116. Each downstack, furthermore, leads into an arcuate return portion, as at 118 and 120, which, in turn, lead back into the upstack 102.

Depending from the junction of the return portions 118 and 120, and in vertical alignment with the upstack 102, is a vertical stack 122 that is open at the top and closed at the bottom. The bottom portion of the stack 122 forms a grinding chamber 124. Tangential by-pass ducts respectively designated 126 and 128, extend from the return portions 118 and 120 to respective relatively narrow inlets or "chokes" 130 leading into the grinding chamber 124. Each of these chokes 130 are preferably provided with Venturi passages. The by-pass ducts 126 and 128 are of reduced diameter relative to the return portions 118 and 120. Opposed high-pressure nozzles 132 connected to a source of fluid pressure (not shown), are arranged to project their high-pressure fluids through the inlets 132 into the grinding chamber 124 where they impact each other. A pair of feed inlets 134 are provided in perpendicular positions relative to the nozzles 132, these inlets 134 also preferably being provided with Venturi passages.

Low pressure nozzles 136, connected to a source (not shown) are arranged tangentially at the bottom of the return portions 118 and 120, at either side of the vertical duct 122.

It will be noted that the upstack 102, as shown, contains a restricted or Venturi section 138 at its median portion. Such Venturi passage acts to accelerate the upward flow of the re-cycling material. However, this is an optional feature which can not only be used in the apparatus of FIG. 4 but in that of FIG. 1 or any of the other mills illustrated. On the other hand, it need not be used in the apparatus of FIG. 4 unless desired.

In addition to the solids feed inlets 134, there are provided auxiliary feed inlets 140 and 142, similar to those shown at 48 and 50 in FIG. 1. These, too, similarly to the inlets 48 and 50, are optional.

In operation, the solid particles are injected into the grinding chamber 124 through the inlets 134 (and also, optionally, through the inlets 140 and 142) and are pulverized by mutual impact under the force of the opposed fluid jets from nozzles 132. The nozzles 132 are not illustrated as being upwardly inclined (although they may be so, if desired). However, there is a circulatory flow through the upstack 138 of the low pressure gases issuing from the nozzles 136. This circulatory flow above the upper end of the stack 122, causes a suction which draws the pulverized products up into the upstack 102. Furthermore, if a Venturi section, such as shown at 138, is used, this increases the suction effect. The cycling action then takes place in the same manner as in the apparatus of FIG. 1.

The relatively heavy, coarser particles are re-cycled through the by-pass ducts 126 and 128 which lead from the radially outermost areas of the return sections 118 and 120 (the areas in which the heavier particles centrifugally circulate). This flow through the by-pass ducts is enhanced by suction created by the flow of the high-pressure gases from the nozzles 132 through the chokes 130 provided with Venturi passages. Meanwhile, the lighter, finer particles will circulate along the radially inner walls of the return sections 118 and 120 back through the upstack 102.

During the flow pattern, the larger volume of the circulating fluids will, together with the finer particles, continue to circulate into the upstack 102 while only a relatively small proportion will descend through the by-pass 126 and 128. This is due to the fact that the by-pass ducts have much smaller diameters than the return sections 118 and 120 and can therefore handle only much smaller volumes of gaseous fluids.

FIG. 5 illustrates a modified form of the mill shown in FIG. 1 wherein the mill, generally designated 200, consists of a common upstack 202 divided at its upper end into oppositely extending arcuate elbow portions 204 and 206 that are respectively integral with downstacks 208 and 210. Each downstack is provided with an outlet duct, as at 212 and 214, which merge into an outlet 216.

At the lower end of each downstack is provided an impellor chamber, as at 218 and 220 respectively, in each of which is provided an oppositely rotating high-speed impellor, as at 222 and 224. Each impellor has a plurality of arcuate blades and is mounted on a shaft such as indicated at 226 and 228, each shaft being driven by an electric motor or the like, such as shown at 230 in FIG. 6. Coaxially surrounding each shaft 226 and 228 is solids feed inlet, as at 232 and 234. At the bottom of each impellor chamber is at least one low pressure fluid inlet, such as shown at 236 and 238.

The mill, with only the parts so far described, can be utilized as an entity by injecting only low pressure fluid through the nozzles 236 and 238 and feeding the solid granular material through the inlets 232 and 234. The oppositely rotating impellors induce a high-speed circulation of the low pressure fluids from the opposed nozzles 236 and 238 and, at the same time, the blades of the impellors pick up the solid particles fed through the inlets 232 and 234 and throw them against each other in the area 240 at the bottom of the upstack 202, whereby impact pulverization is effected.

As an optional feature which increases the grinding power of this mill, there is provided a dependent grinding chamber 242, similar to the chamber 12 of FIG. 1 and similarly provided with a plurality of horizontally and vertically angled high-pressure nozzles 244. Opposed feed inlets 246 may also be provided for the chamber 242. In this type apparatus, not only is pulverization effected in the area 240, but the largest and heaviest solid particles, plus some of the impellor-accelerated fluid, are centrifugally thrown by the impellors 222 and 224 into the grinding chamber 242 while additional solids are fed through the inlets 246. All of these particles within the chamber 242 are then subjected to the impact action of the fluid streams from the high-pressure nozzles 244, thereby obtaining a more rapid and greater degree of pulverization of all the particles.

Mills of this type are especially well suited for grinding brittle materials such as coal, coke, metals, ceramics, plastics, and the like.

If desired, the inlets 246 may be withheld from use while all the feeding is accomplished through the inlets 232 and 234. On the other hand, the inlets 232 and 234 need not be used and only the inlets 246 can be used. In the latter case, the impellors 222 and 224 may be used only for acceleration and circulation of the fluids from the low pressure nozzles while the pulverization is primarily effected in the chamber 242, in similar manner to the mill of FIG. 1. In such case, it would usually be preferably to substitute impellors with straight blades for the arcuate ones shown since there would be less solids-projecting function involved and the straight blades would permit a greater proportion of the fluids to be propelled into the grinding chamber 242.

Another optional method of using this mill is to utilize only the fluids from the high-pressure nozzles 244, depending on the impellors 222 and 224 to accelerate and circulate whatever fluids rise from the chamber 244 during the pulverization process. In such case, the low pressure nozzles 236 and 238 would be shut off entirely.

In some instances, as when relatively soft granular materials are to be ground into relatively coarse particle size, neither the high nor the low pressure nozzles need be used, the rotating impellors providing all the required fluid circulation. In such case, however, air or a similar fluid not under pressure, should be bled into the mill to provide the fluid medium.

FIG. 7 illustrates a mill, generally designated 300, which is similar to the mill in FIG. 4 in all its parts except that at the lower end of the downstacks 302 and 304 there are provided impellor chambers respectively designated 306 and 308 which laterally intersect the lower portion of the upstack 310. Oppositely rotating impellors 312 and 314 are positioned in the chambers 306 and 308 and are provided with feed inlets, respectively designated 316 and 318.

Extending tangentially down from each impellor chamber 306 and 308 is a relatively narrow by-pass duct, as at 320 and 322 respectively. These by-pass ducts lead into a grinding chamber 324, and are intersected by opposed high-pressure nozzles 326 which are arranged to project high-pressure fluid streams against each other in the grinding chamber.

A vertical stack 328 leads into the central area 330 between the impellors. This central area connects with the upstack 310 which, in turn, connects with the opposed elbow portions 332 and 334. They, in turn, lead into the downstacks 302 and 304 which are provided with the outlet ducts 336 and 338 which merge into outlet 340.

In this mill, the action is similar to that of the mill of FIG. 4, except that the impellors 312 and 314 provide the acceleration and recirculation of the fluid. The fluid itself is supplied by the high-pressure nozzles 326, but the primary energy thereof is used in the pulverization process because the impellors supply the circulatory energy.

Although the mill of FIG. 7 is not provided with feed inlets directly into the grinding chamber, but depends only on the inlets 316 and 318 for this purpose, such auxiliary feed inlets into the grinding chamber may be provided, if desired.

FIG. 8 illustrates another variation of the invention wherein the mill, generally designated 400, comprises an upstack 402 having oppositely divergent arcuate elbow portions 404 and 406 at its upper end. These elbow portions lead into respective downstacks 408 and 410 which, in turn, lead into lower arcuate elbow portions, respectively designated 412 and 414, which form initial impact chambers. These, in turn, lead back into the lower end of the upstack 402.

At the lower bends of the elbow portions 412 and 414 are provided tangential high-pressure fluid nozzles 416 and 418 respectively. These nozzles supply the fluid medium for the grinding process and their tangential arrangement causes the flow to pass upwardly through the upstack 402.

At the juncture of each upper elbow portion 404 and 406 and its respective downstack 408 and 410, is provided an aperture, as at 420 and 422 respectively. These apertures lead into corresponding chambers 424 and 426 in which are rotatably positioned corresponding impellors 428 and 430. These impellors are driven by reversible motors or the like (not shown) and may, therefore, rotate in either direction. The blades of each impellor are arranged at a relatively sharp arcuate angle.

The impellors are mounted on shafts respectively designated 432 and 434, which are coaxially surrounded by outlets respectively designated 436 and 438.

Feed inlets, respectively, designated 444 and 446, are connected to the corresponding downstacks 408 and 410.

In this embodiment of the invention, the solids are fed through inlets 444 and 446 and are entrained in the respective circulatory fluid vortices formed by the pressure fluid which enters through the tangential nozzles 416 and 418 and circulates through the upstack 402 and down through the downstacks 408 and 410. Pulverization takes place by impact in these vortices. The lower portion of the upstack 402 forms a recycle chamber that is vertically offset from the impact chambers 412 and 414.

As the fluids and entrained pulverized solids pass around the arcuate elbow portions 404 and 406, the larger, heavier particles are centrifugally propelled around the outer portions of the mill while the smaller, lighter particles pass around the inner portions. As these lighter particles pass the outlet openings 420 and 422, they pass into the respective impellor chambers 424 anad 426. As illustrated, when the blades of the impellors 428 and 430 are stationary, the exhausted particles and fluid passing through the openings 420 anad 422 flow in a reverse, arcuate path between the adjacent blades into the outlets 436 and 438. This reverse path permits additional separation of the heavier from the lighter particles because the heavier particles tend to be carried away back through the outlet openings 420 and 422.

If the impellor 428 is rotated counterclockwise and the impellor 430 is rotated clockwise, the angle of the exhaust path becomes smaller or sharper, and there is greater separation between the larger and smaller particles. If, on the other hand, the impellor 428 is rotated clockwise and the impellor 430 is rotated counterclockwise, the angle of the exhaust path becomes larger and more of the coarse, heavier particles will be exhausted. In this manner, there is provided a simple and efficient method of control of the particle size of the product.

The suction created by the impellors 420 and 422 also tends to accelerate the movement of the fluid and particles through the upstack 402.

If desired, the dependent grinding chamber and auxiliary low pressure fluid nozzles of FIGS. 1 and 4 or the impellor ararngements of FIGS. 5 and 7 may be combined with the impellor exhaust means of FIG. 8.

The various types of apparatus described above may be used to grind or pulverize almost any type of solid material such as coal, coke, metal, synthetic resins and other plastics, ceramics, foods such as instant coffee, tea or cocoa as well as other concentrates, pharmaceuticals, pigments, gels, etc. The fluid medium may be not only hot or cold air, steam, combustion gases, and the like but also inert gases such as nitrogen and the like or chemically active gases such as hydrogen chloride, etc. In this respect, it is to be noted that, in addition to grinding or pulverization, the apparatus of this invention may be used for mixing solid particles with other solid or liquid materials, for coating particles with other solid, viscous or fluid materials, and for chemical reactions between solid and other solid or fluid materials of different compositions. These results can be obtained by using different inlets to feed the different materials, and by varying the temperature and pressure of the fluid medium to suit the particular conditions required.

Obviously many modifications and variations of the present invention are possible in the light of the above teachings. It is, therefore, to be understood that within the scope of the appended claims, the invention may be practiced otherwise than as specifically described.

The invention claimed is:

1. Apparatus for treating solid particles comprising an impact chamber, fluid nozzle means arranged to propel elastic fluid under pressure into said impact chamber, feed means for feeding solid particles into said impact chamber, a first stack in open connection with said impact chamber, an arcuate classification section in open connection with said first stack, an outlet conduit in open connection with said classification section and constructed and arranged to centrifugally receive fluid and pulverized particles from said classification section, a second stack in open connection with said classification section, said second stack being in open connection with a recycle chamber which is in open connection with the inlet end of the first stack to provide a circulatory path of flow between the first stack, the classification section, and the second stack, and means to accelerate the flow of fluid and particles through at least a portion of the circulatory path.

2. The apparatus of claim 1 wherein said impact chamber is offset from but in lateral open connection with said recycle chamber, and said fluid nozzle means being constructed and arranged to propel fluid and pulverized particles produced by impact into said recycle chamber.

3. The apparatus of claim 1 wherein the means to accelerate the flow comprises at least one nozzle connected to a source of fluid under pressure.

4. The apparatus of claim 1 wherein the means to accelerate the flow comprises at least one impellor in said circulatory path, and means to selectively rotate said impellor.

5. The apparatus of claim 1 wherein a by-pass conduit connects said second stack with said impact chamber, said by-pass conduit being tangential to said circulatory path and being of reduced diameter relative to said second stack, said by-pass conduit being constructed and arranged to deliver a portion of the recycled fluid and particles into the path of the fluid propelled from said fluid nozzle means.

6. The apparatus of claim 1 wherein an impeller chamber is positioned between said classification section and said outlet conduit and is in open connection therewith, an impellor rotatably positioned in said impellor chamber, said impellor forming a passage between its blades from said classification section to said outlet conduit and also acting as said means to accelerate the flow, and means to selectively rotate said impellor.

7. The apparatus of claim 1 wherein said first stack leads into separate opposed classification sections, each classification section leading into a separate second stack, each second stack having a return portion leading into said recycle chamber.

8. The apparatus of claim 1 wherein there is an impellor chamber positioned between said first stack, said second stack and said recycle chamber, said impellor chamber being in open connection with each of said stacks and said recycle chamber, an impellor rotatably positioned in said impellor chamber, and means to selectively rotate said impellor.

9. A method of treating solid particles which comprises initially impacting the particles against each other in an area of initial impact under the force of a fluid under pressure, and centrifugally separating the smaller, lighter particles from the larger, heavier particles, while accelerating the flow of said larger, heavier particles and their entraining fluid through at least a portion of a circulatory path, said portion of the circulatory path being offset from the area of initial impact whereby at least a portion of the accelerated flow by-passes said area of initial impact.

10. The method of claim 9 wherein said smaller, lighter particles are separated from the larger, heavier particles by centrifugally passing the smaller, lighter particles through a selectively angularly variable outlet passage.

11. The method of claim 9 wherein a portion of said larger, heavier particles are centrifugally recycled through the area of initial impact for further impact.

References Cited

UNITED STATES PATENTS

| 2,325,080 | 7/1943 | Stephanoff | 241—5 |
| 2,385,508 | 9/1945 | Hammond | 241—5 |
| 2,590,219 | 3/1952 | Stephanoff | 241—5 |
| 3,252,663 | 5/1966 | Kidwell | 241—39 |

WILLIAM S. LAWSON, Primary Examiner

U.S. Cl. X.R.

241—19, 26, 39